United States Patent
Son et al.

(10) Patent No.: US 11,087,923 B2
(45) Date of Patent: Aug. 10, 2021

(54) MULTI-LAYERED CERAMIC CAPACITOR

(71) Applicant: SAMSUNG ELECTRO-MECHANICS CO., LTD., Suwon-si (KR)

(72) Inventors: Soo Hwan Son, Suwon-si (KR); Young Ghyu Ahn, Suwon-si (KR); Jea Yeol Choi, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 0 days.

(21) Appl. No.: 16/569,331

(22) Filed: Sep. 12, 2019

(65) Prior Publication Data
US 2020/0143989 A1    May 7, 2020

(30) Foreign Application Priority Data
Nov. 2, 2018   (KR) .......................... 10-2018-0133201

(51) Int. Cl.
| | |
|---|---|
| H01G 2/14 | (2006.01) |
| H01G 4/30 | (2006.01) |
| H01G 4/005 | (2006.01) |

(52) U.S. Cl.
CPC .............. *H01G 2/14* (2013.01); *H01G 4/005* (2013.01); *H01G 4/30* (2013.01)

(58) Field of Classification Search
CPC ............. H01G 2/14; H01G 4/005; H01G 4/30
See application file for complete search history.

(56) References Cited

U.S. PATENT DOCUMENTS

| | | | | |
|---|---|---|---|---|
| 7,633,735 | B2* | 12/2009 | Urakawa ................... | H01T 4/12 361/112 |
| 7,685,703 | B1* | 3/2010 | Devoe .................... | H01G 4/228 29/840 |
| 9,380,687 | B2* | 6/2016 | Asakura .................... | H01T 4/12 |
| 9,795,020 | B2* | 10/2017 | Shibayama ............... | H01T 4/12 |
| 2008/0079533 | A1* | 4/2008 | Liu ......................... | H01C 7/105 338/21 |

(Continued)

FOREIGN PATENT DOCUMENTS

| | | | |
|---|---|---|---|
| JP | | 2998538 B2 | 1/2000 |
| KR | 10-2015-0082936 A | | 7/2015 |

(Continued)

OTHER PUBLICATIONS

Office Action issued in corresponding Korean Patent Application No. 10-2018-0133201 dated Jan. 6, 2020, with English translation.

*Primary Examiner* — Dion Ferguson
(74) *Attorney, Agent, or Firm* — Morgan, Lewis & Bockius LLP

(57) ABSTRACT

A multi-layered ceramic capacitor capable of realizing an improved process yield and miniaturization while having an overvoltage protection function may be provided. The multi-layered ceramic capacitor may include a ceramic body including a first internal electrode, a second internal electrode, a dielectric layer, and an overvoltage protection layer; and an external electrode disposed at both ends of the ceramic body, wherein the overvoltage protection layer may be disposed between the first internal electrode and the second internal electrode.

21 Claims, 4 Drawing Sheets

(56) References Cited

U.S. PATENT DOCUMENTS

| | | | | |
|---|---|---|---|---|
| 2009/0296294 | A1* | 12/2009 | Liu | H01T 21/00 |
| | | | | 361/56 |
| 2011/0222203 | A1* | 9/2011 | Adachi | H01T 4/12 |
| | | | | 361/220 |
| 2011/0279945 | A1* | 11/2011 | Tsukizawa | H05K 9/0067 |
| | | | | 361/220 |
| 2013/0208395 | A1* | 8/2013 | Bultitude | H01C 1/14 |
| | | | | 361/275.1 |
| 2014/0198422 | A1* | 7/2014 | Jones | H01G 4/005 |
| | | | | 361/91.1 |
| 2017/0236640 | A1* | 8/2017 | Kim | H01G 2/14 |
| | | | | 361/220 |
| 2018/0124904 | A1* | 5/2018 | Cho | H01G 4/40 |
| 2018/0137979 | A1* | 5/2018 | Kim | H01G 2/06 |
| 2018/0182558 | A1* | 6/2018 | Byun | H01G 4/232 |
| 2019/0141825 | A1* | 5/2019 | Cho | H01C 7/10 |

FOREIGN PATENT DOCUMENTS

| | | |
|---|---|---|
| KR | 10-2018-0035440 A | 4/2018 |
| KR | 10-2018-0065008 A | 6/2018 |

\* cited by examiner

MULTI-LAYERED CERAMIC CAPACITOR

CROSS-REFERENCE TO RELATED APPLICATION(S)

This application claims the benefit of priority to Korean Patent Application No. 10-2018-0133201 filed on Nov. 2, 2018 in the Korean Intellectual Property Office, the entire disclosure of which is incorporated herein by reference.

TECHNICAL FIELD

The present disclosure relates to a multi-layered ceramic capacitor.

BACKGROUND

A multi-layered ceramic capacitors (MLCC) is generally mounted on a printed circuit board of various electronic products such as a mobile communication terminal, a notebook computer, a personal computer, a personal digital assistant (PDA), and the like, and a chip-shaped condenser serving to charge or discharge electricity, and has various sizes and lamination shapes depending on the application use and capacity of the capacitor.

In accordance with a miniaturization trend of electronic products, the multi-layered ceramic capacitor is also required to be miniaturized and to have high capacity. Accordingly, various attempts have been made to make the dielectric and internal electrodes thinner and laminated in greater numbers, and in recent years, multi-layered ceramic capacitors in which the number of laminated layers increases as the thickness of the dielectric layers is reduced have been manufactured.

When an overvoltage is applied to such a multi-layered ceramic capacitor, an insulation performance of a plurality of dielectric layers may be destroyed, thereby lowering insulation resistance and causing short circuits.

In order to solve such a problem, a method of bonding a varistor to a multi-layered ceramic capacitor, or the like, has been proposed, but there is a problem of limitations of the miniaturization and a low process yield.

SUMMARY

An aspect of the present disclosure is to provide a multi-layered ceramic capacitor having an overvoltage protection function.

The present disclosure relates to a multi-layered ceramic capacitor. According to an aspect of the present disclosure, a multi-layered ceramic capacitor may include: a ceramic body including a first internal electrode, a second internal electrode, a dielectric layer, and an overvoltage protection layer; and an external electrode disposed at both ends of the ceramic body, wherein the overvoltage protection layer may be disposed between the first internal electrode and the second internal electrode.

According to another aspect of the present disclosure, a multi-layered ceramic capacitor of the present disclosure may include: a ceramic body including an internal electrode, a dielectric layer, and an overvoltage protection layer; and an external electrode disposed at both ends of the ceramic body, wherein an insulation resistance of the overvoltage protection layer may be lower than an insulation resistance of the dielectric layer, when an overvoltage is applied.

According to still another aspect of the present disclosure, a multi-layered ceramic capacitor of the present disclosure may include: a ceramic body including a plurality of internal electrodes, a plurality of dielectric layers interposed between adjacent internal electrodes of the plurality of internal electrodes, and at least one overvoltage protection layer; and first and second external electrodes disposed on both ends of the ceramic body, wherein the at least one overvoltage protection layer is disposed between two internal electrodes among the plurality of internal electrodes.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Figure 1:
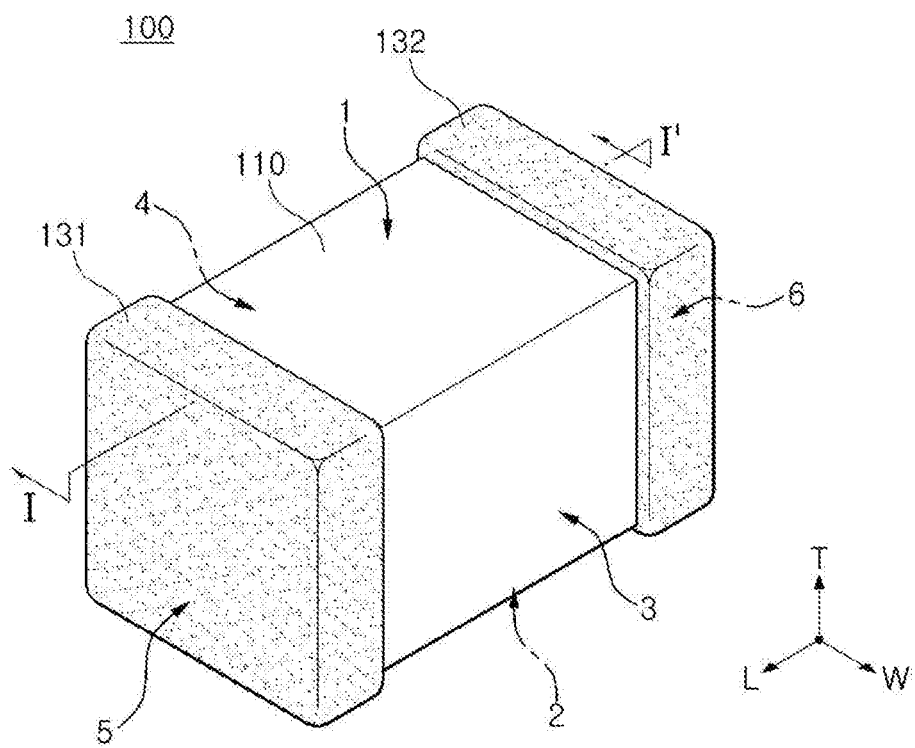
FIG. 1 is a schematic perspective view of a multi-layered ceramic capacitor to which the present disclosure is applied.

Hereinafter, exemplary embodiments of the present disclosure will now be described in detail with reference to the accompanying drawings. The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art. In the drawings, the shapes and dimensions of elements may be exaggerated for clarity. Further, in the drawings, elements having the same functions within the same scope of the inventive concept will be designated by the same reference numerals.

Throughout the specification, when a component is referred to as "comprise" or "comprising," it means that it may include other components as well, rather than excluding other components, unless specifically stated otherwise.

In addition, throughout the specification, to be formed "on" means not only to be formed in direct contact, but also means that it may further comprise other components.

In order to clearly illustrate the present disclosure in the drawings, portions not related to the description are omitted, and thicknesses are enlarged in order to clearly illustrate various layers and regions, and similar reference numerals are used for similar portions throughout the specification.

In addition, it is also to be understood that the terms first, second, and the like, used hereinafter are merely reference numerals for distinguishing between identical or corresponding components, and the same or corresponding components are defined by terms such as first, second and the like.

Hereinafter, preferred embodiments of the present disclosure will be described in detail with reference to the accompanying drawings.

Figure 2:
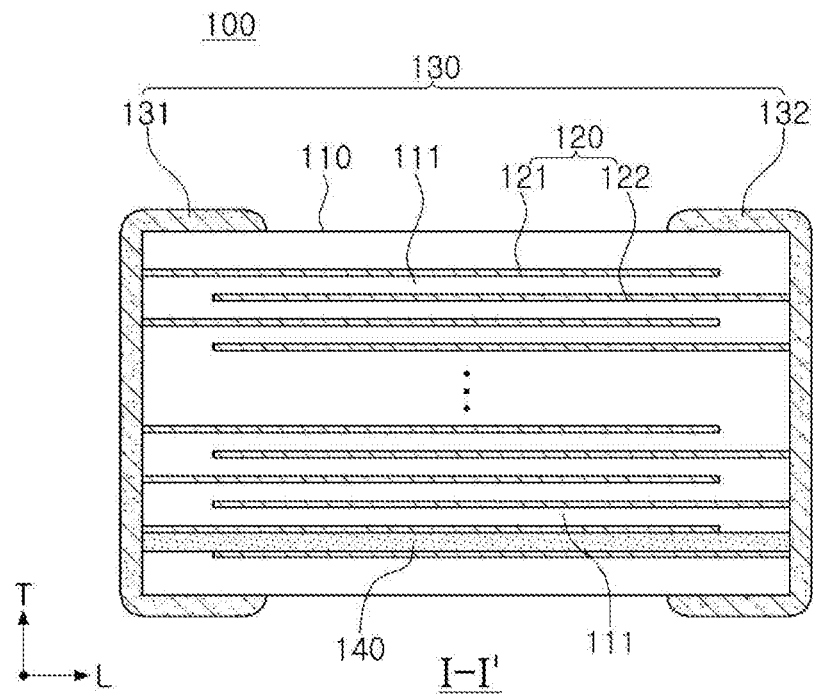
FIG. 2 is a cross-sectional view of a multi-layered ceramic capacitor according to an embodiment of the present disclosure.

FIG. 1 is a schematic perspective view of a multi-layered ceramic capacitor to which the present disclosure is applied. FIG. 2 is a cross-sectional view of taken along line I-I' of FIG. 1 according to an embodiment of the present disclosure.

Referring to FIGS. 1 and 2, a multi-layered ceramic capacitor 100 to which the present disclosure is applied may include a ceramic body 110 including a first internal electrode 121, a second internal electrode 122, a dielectric layer 111, and an overvoltage protection layer 140, and external electrodes 131 and 132 disposed on both ends of the ceramic body 110. The overvoltage protection layer 140 may be in contact with the first internal electrode 121 and the second internal electrode 122. The overvoltage protection layer 140 is in contact between the first internal electrode 121 and the second internal electrode 122, which may mean a structure in which one surface of the overvoltage protection layer 140 is disposed in contact with the first internal electrode 121 and the other surface of the overvoltage protection layer 140 is disposed in contact with the second internal electrode 122. The structure may mean a structure in which the first internal electrode 121, the overvoltage protection layer 140, and the second internal electrode 122 are sequentially stacked. The overvoltage protection layer 140 may be disposed in contact between the first inner electrode 121 and the second inner electrode 122, such that damages to the dielectric layer 111 and the internal electrode 120 may be prevented when an overvoltage is applied to the multilayer ceramic capacitor, and the size of the capacitor may be reduced.

The dielectric layer 111 may include a ceramic material having a high a dielectric constant, for example, a barium titanate ($BaTiO_3$)-based material or a strontium titanate ($SrTiO_3$)-based material, but other materials known in the art may be used as long as sufficient electrostatic capacity may be obtained. The dielectric layer 111 may be a ceramic green sheet made of a ceramic material in a sheet form, but is not limited thereto.

A thickness of the dielectric layer 111 may be arbitrarily changed according to a capacitance design of the capacitor, and for example, the thickness of the dielectric layer 111 after firing may be 0.1 μm or more per layer, but is not limited thereto.

Meanwhile, a ceramic additive, an organic solvent, a plasticizer, a binder, and a dispersant may be further added to the dielectric layer 111, together with the ceramic material. The ceramic additive may be, for example, at least one of a transition metal oxide, a carbide, a rare earth element, magnesium (Mg), aluminum (Al), sodium (Na), zirconium (Zr), calcium (Ca), or a divalent cationic compound.

As illustrated in FIG. 2, the first and second internal electrodes 121 and 122 may be formed on the ceramic sheet forming the dielectric layer 111 and stacked in a thickness direction, and may then be alternately disposed inside the ceramic body 110 with one dielectric layer 111 interposed therebetween by firing.

The first and second internal electrodes 121 and 122 are electrodes having different polarities, and may be disposed to oppose each other in a length direction of the dielectric layer 111 and may be electrically insulated with each other by the dielectric layer 111 disposed in the middle.

One ends of the first and second internal electrodes 121 and 122 may be exposed through both surfaces of the ceramic body 110 in a longitudinal direction, respectively. End portions of the first and second internal electrodes 121 and 122 alternately exposed through the both surfaces of the ceramic body 110 in the longitudinal direction may be connected to the external electrodes 131 and 132, respectively on both side surfaces of the ceramic body 110 in the longitudinal direction and may be electrically connected to each other.

Hereinafter, the external electrodes 131 and 132 may be referred to as a first electrode 131 and a second external electrode 132, respectively.

In this case, the first and second internal electrodes 121 and 122 may be formed of a conductive metal, and a material such as nickel (Ni), copper (Cu), palladium (Pd), silver (Ag), nickel (Ni) alloy, or the like, may be used, but the present disclosure is not limited thereto.

Thicknesses of the first and second internal electrodes 121 and 122 may be appropriately determined depending on intended use, and the like, and are not particularly limited. For example, the thicknesses may be 0.1 μm to 5 μm or 0.1 μm to 2.5 μm.

The first and second external electrodes 131 and 132 may be formed by sintering a conductive paste for external electrodes containing copper (Cu) in order to provide high reliability such as excellent heat cycle resistance and moisture resistance, while having good electric characteristics, and the present disclosure is not limited thereto.

Meanwhile, a plating layer (not shown) may be formed on the first and second external electrodes 131 and 132.

The plating layer may include, for example, first and second nickel (Ni) plating layers formed on the first and second external electrodes 131 and 132, respectively, and first and second tin (Sn) plating layers formed on the first and second nickel plating layers, respectively.

Thicknesses of the first and second external electrodes 131 and 132 may be appropriately determined depending on intended use, and the like, and are not particularly limited. For example, the thicknesses may be 10 μm to 50 μm.

The ceramic body 110 is not particularly limited in shape, but may have a generally hexahedral shape. The ceramic body 110 may have a substantially hexahedral shape although it is not a complete hexahedral shape due to firing shrinkage of a ceramic powder at the time of firing the chip, the difference in thickness according to existence and non-existence of the internal electrode pattern and polishing of the edge portion of the ceramic body. In addition, the dimensions thereof are not particularly limited, and an appropriate size may be determined depending on intended use, and may be, for example, (0.6 to 5.6 mm)*(0.3 to 5.0 mm)*(0.3 to 1.9 mm). In addition, the number of laminated layers of the dielectric layer 111 of the ceramic body 110 may be controlled according to the intended use of the multi-layered ceramic capacitor, and may be, for example, 100 layers or more, 200 layers or more or 500 layers or more, but is not limited thereto.

In order to clearly illustrate embodiments of the present disclosure, when directions of the hexahedron are defined, L, W, and T shown in the drawings indicate a longitudinal direction, a width direction, and a thickness direction, respectively. Here, the thickness direction. Here, the thickness direction may be used in the same concept as the lamination direction in which the dielectric layers are laminated. In the present specification, the longitudinal direction may mean a first direction, the width direction may mean a second direction, and the third direction may be used to mean a thickness direction.

Figure 3:
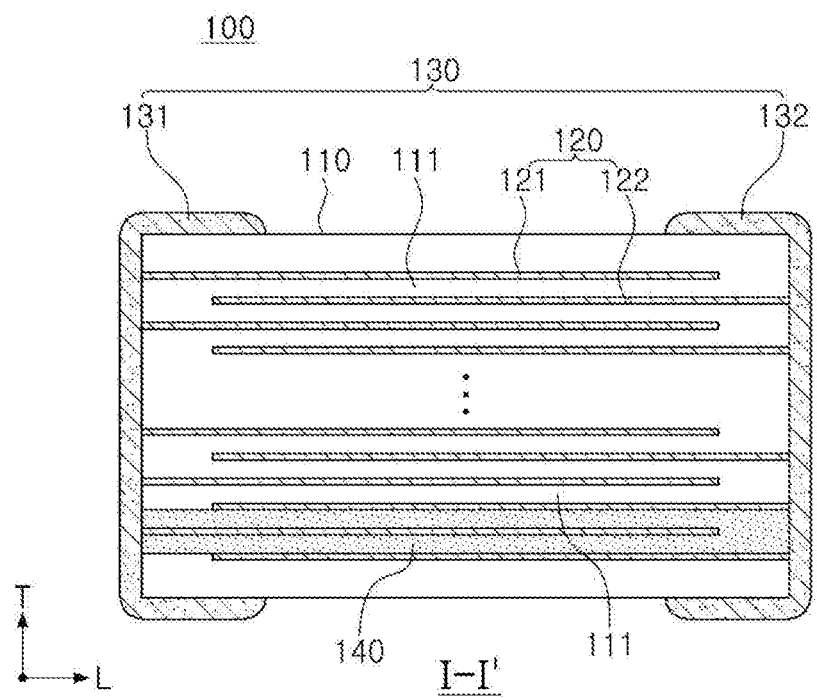
FIG. 3 is a cross-sectional view of a multi-layered ceramic capacitor according to an embodiment of the present disclosure.

In an embodiment of the present disclosure, the multi-layered ceramic capacitor according to the present disclosure may have two or more overvoltage protection layers adjacent to each other. FIG. 3 is a schematic cross-sectional view illustrating the embodiment. Referring to FIG. 3, two or more overvoltage protection layers 140 may be disposed inside the ceramic body 110, the two or more overvoltage protection layers 140 being disposed adjacent to each other. When the multi-layered ceramic capacitor according to the present disclosure includes two or more overvoltage protection layers 140, an input current may be efficiently bypassed when an overvoltage is applied.

Figure 4:
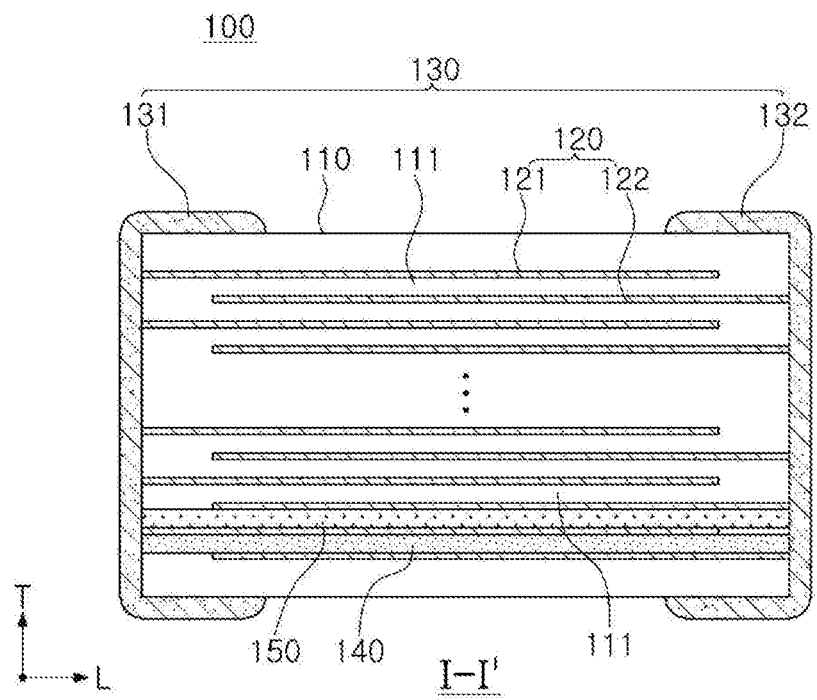
FIG. 4 is a cross-sectional view of a multi-layered ceramic capacitor according to an embodiment of the present disclosure.

In another embodiment of the present disclosure, in the multi-layered ceramic capacitor according to the present disclosure, a first internal electrode 121, an overvoltage protection layer 140, a second internal electrode 122, and an isolation layer 150 may be sequentially laminated. FIG. 4 is a schematic cross-sectional view illustrating a multi-layered ceramic capacitor to which an isolation layer is applied. Referring to FIG. 4, an isolation layer 150 may be disposed between the overvoltage protection layer 140 and the dielectric layer 111, and the isolation layer 150 may be disposed not to be in direct contact with the dielectric layer 111 and the overvoltage protection layer 140 with each other. The isolation layer 150 may be made of the same dielectric material as the dielectric layer 111 described above, and the dielectric layer 111 and the overvoltage protection layer 140 may be simultaneously fired.

Figure 5:
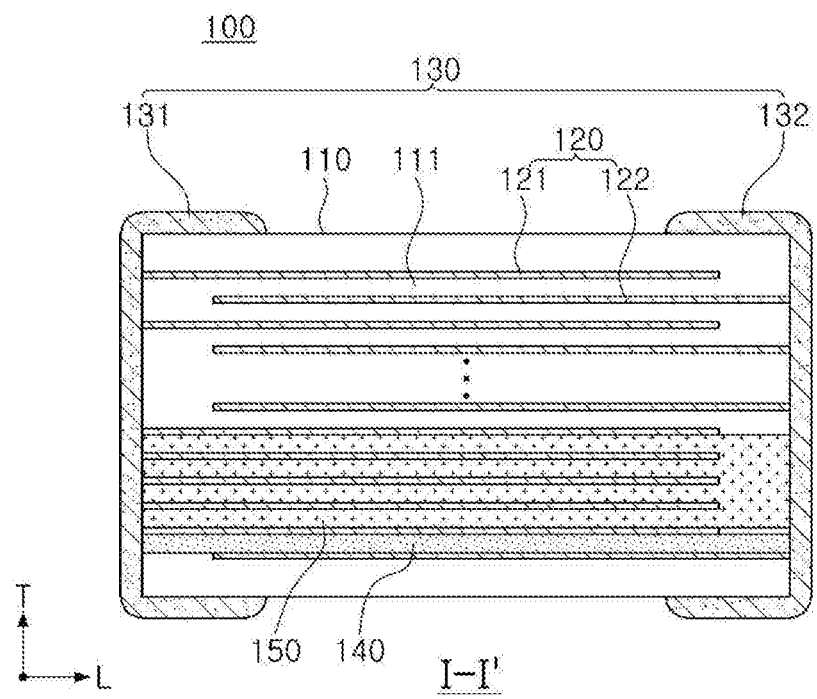
FIG. 5 is a cross-sectional view of a multi-layered ceramic capacitor according to an embodiment of the present disclosure.

In addition, two or more isolation layers 150 according to the present disclosure may be disposed adjacent to each other. FIG. 5 is a schematic cross-sectional view illustrating a multi-layered ceramic capacitor in which two or more isolation layers 150 are disposed adjacent to each other. Referring to FIG. 5, the overvoltage protection layer 140 may be disposed to be spaced apart from the dielectric layer 111 through the isolation layer 150, and may form electrodes having the same polarity between the dielectric layer 111 and the overvoltage protection layer 140 to effectively prevent the dielectric layer 111 from being damaged when an overvoltage is applied.

Figure 6:
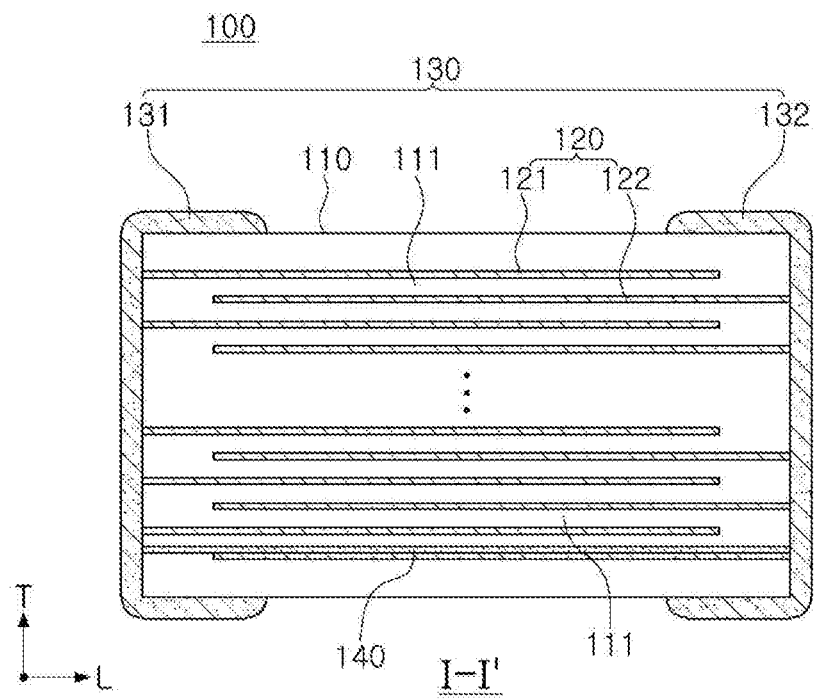
FIG. 6 is a cross-sectional view of a multi-layered ceramic capacitor according to an embodiment of the present disclosure.

In an example of the present disclosure, the multi-layered ceramic capacitor according to the present disclosure may be formed such that the first internal electrode, the overvoltage protection layer, a dielectric layer and the second internal electrode are sequentially laminated. FIG. 6 is a schematic cross-sectional view illustrating a multi-layered ceramic capacitor in which a first internal electrode 121, an overvoltage protection layer 140, a dielectric layer 111 and a second internal electrode 122 are sequentially stacked in a ceramic body 110. FIG. 6 illustrates that the overvoltage protection layer 140 is disposed in an upper portion of the internal electrode 120 based on the thickness direction of the multi-layered ceramic capacitor, but the overvoltage protection layer 140 is disposed on a lower portion of the internal electrode 120 based on the thickness direction of the multi-layered ceramic capacitor, and may mean all kinds of structures in which the overvoltage protection layer 140 is attached to the internal electrode 120.

Figure 7:
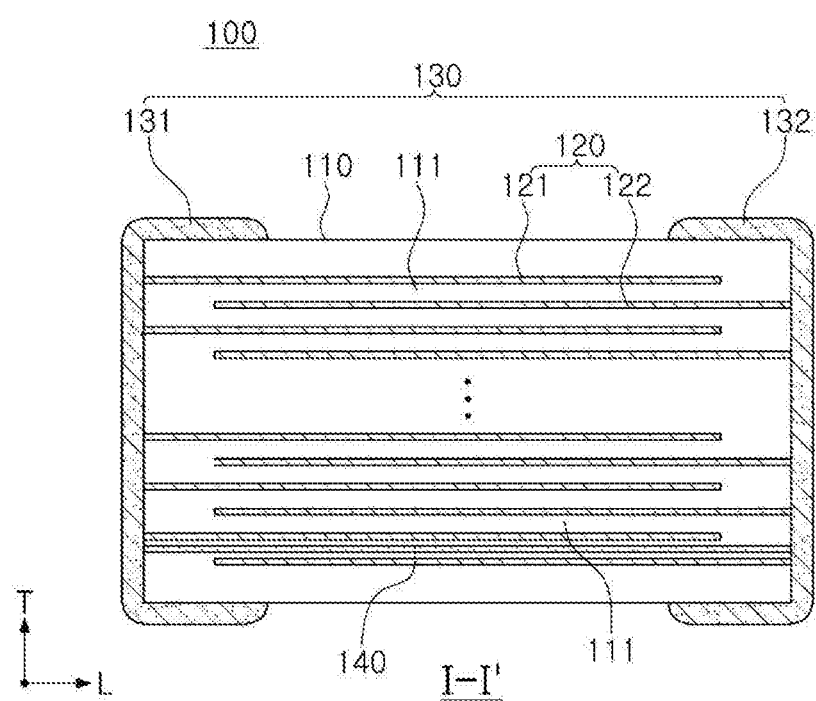
FIG. 7 is a cross-sectional view of a multi-layered ceramic capacitor according to an embodiment of the present disclosure.

In another embodiment of the present disclosure, a multi-layered ceramic capacitor according to the present disclosure may be formed such that a first internal electrode, a dielectric layer, an overvoltage protection layer and a second internal electrode are sequentially laminated. FIG. 7 is a schematic cross-sectional view of the present embodiment. Referring to FIG. 7, the overvoltage protection layer 140 may be disposed between the dielectric layers 111, and may be disposed to be spaced apart from the internal electrodes 121 and 122 through the dielectric layer 111.

In another example of the present disclosure, a multi-layered ceramic capacitor according to the present disclosure may include a ceramic body including an internal electrode, a dielectric layer, and an overvoltage protection layer; and an external electrode disposed at both ends of the ceramic body. An insulation resistance of the overvoltage protection layer when an overvoltage is applied may be lower than an insulation resistance of the dielectric layer when an overvoltage is applied. In the present specification, an insulation resistance (IR) may mean a numerical value of insulation resistance measured under the same conditions. The insulation resistance of the overvoltage protection layer 140 when the overvoltage is applied is lower than the insulation resistance of the dielectric layer 111, which may mean that the value of the insulation resistance of the overvoltage protection layer 140 measured under the same conditions is lower than the value of the insulation resistance of the dielectric layer 111. In addition, in the present specification, an overvoltage may mean a voltage which is 1.5 times or more, 2 times or more or 3 times or more of a rated voltage for use of the multi-layered ceramic capacitor according to the present disclosure. An upper limit thereof is not particularly limited, but may mean a voltage having a size of 10,000 times or less thereof, but is not limited thereto. The multi-layered ceramic capacitor according to the present disclosure may introduce the overvoltage protection layer 140 having a lower insulation resistance than that of the first dielectric layer 111 when the overvoltage is applied and allow a current to flow through the overvoltage protection layer 140 when the overvoltage is applied, thereby preventing the insulation performance of the first dielectric layer 111 from being deteriorated.

In an example of the present disclosure, the overvoltage protection layer 140 may exhibit the same or similar insulation resistance as the insulation resistance of the dielectric layer 111 when a rated voltage is applied. The overvoltage protection layer 140 exhibits the same or similar insulation resistance as that of the dielectric layer 111 when the rated voltage is applied, which may mean when the rated voltage is applied to the overvoltage protection layer 140, a ratio (B/A) of the insulation resistance A of the overvoltage protection layer 140 and the insulation resistance B of the dielectric layer 111 satisfies a range of 0.5 to 10, but is not limited thereto. The insulation resistance of the overvoltage protection layer 140 may be, for example, about 0.1 MΩ (mega Ω) or more, when the rated voltage is applied, and an upper limit thereof is not particularly limited, but may be about 100 GΩ (giga Ω) or less, but is not limited thereto. The overvoltage protection layer according to the present disclosure exhibits the same or similar insulation resistance as that of the dielectric layer when the rated voltage is applied. However, when an overvoltage, higher than the rated voltage is applied, the insulation resistance decreases and the current due to the applied overvoltage may be passed. Therefore, damages to the multi-layered ceramic capacitor due to the overvoltage may be prevented.

In one example, a ratio (B/A) of the insulation resistance A of the overvoltage protection layer 140 and the insulation resistance B of the dielectric layer 111, when the overvoltage is applied may be within a range of $10^2$ to $10^9$. The ratio (B/A) of the insulation resistance may be, for example, $10^2$ or more, $2\times10^2$ or more, $3\times10^2$ or more, $4\times10^2$ or more, $5\times10^2$ or more, $6\times10^2$ or more, $7\times10^2$ or more, $8\times10^2$ or more, $9 \times 10^2$ or more or $10^3$ or more, but the present disclosure is not limited thereto. An upper limit thereof is not particularly limited, may be for example, $10^9$ or less, but is not limited thereto. When the ratio (B/A) of the insulation resistance A of the overvoltage protection layer 140 and the insulation resistance B of the dielectric layer 111 when the overvoltage is applied, satisfies the above-described range, the performance of the multi-layered ceramic capacitor may not be affected, and the current due to the applied overvoltage may be efficiently bypassed. Therefore, even when an overvoltage is applied to the multi-layered ceramic capacitor, excellent reliability may be exhibited as long as performance deterioration does not occur.

The overvoltage protection layer applied to the present disclosure may include a ceramic material, and may include for example, a barium titanate ($BaTiO_3$)-based material or a strontium titanate ($SrTiO_3$)-based material. The overvoltage protection layer may be a ceramic green sheet made of a ceramic material in a sheet form, but is not limited thereto. A thickness of the overvoltage protection layer may be arbitrarily changed according to the design of the capacitor. For example, the thickness after firing may be 0.1 μm or more per layer, but is not limited thereto.

In order to form the overvoltage protection layer, a ceramic additive, an organic solvent, a plasticizer, a binder, and a dispersant may be further added thereto, together with the ceramic material. The ceramic additive may be at least one of a transition metal oxide, barium (Ba), titanium (Ti), calcium (Ca), zinc (Zn), manganese (Mn), lanthanum (La), strontium (Sr), silicon (Si), aluminum (Al), a carbide, a rare earth element, magnesium (Mg), sodium (Na), zirconium (Zr), or an oxide thereof or a divalent cationic compound. When an excess amount of sodium (Na), zirconium (Zr), calcium (Ca) or divalent cationic compound, or the like is contained in the ceramic additive as compared with the dielectric layer, an overvoltage protection layer having an insulation resistance, lower than that of the dielectric layer, when an overvoltage is applied, may be formed, while the overvoltage protection layer may have the same as or similar insulation resistance as that of the dielectric layer, when the rated voltage is applied as described above. Therefore, the overvoltage protection function of the multi-layered ceramic capacitor may be ensured.

A method for manufacturing the multi-layered ceramic capacitor is not particularly limited. For example, a conductive paste for internal electrodes is applied by a screen printing method on the above-described ceramic green sheet to form internal electrodes, and the ceramic green sheets for forming the above-described overvoltage protection layer are laminated and then fired to manufacture a ceramic body. A method of spraying the conductive paste for external electrode to the end of the ceramic body manufactured and then firing the sprayed conductive paste for external electrode may be used, but the present disclosure is not limited thereto.

As described above, in the multi-layered ceramic capacitor according to the embodiments of the present disclosure, since the overvoltage protection layer is disposed inside the ceramic body, a product may be miniaturized while maintaining the performance of the product even when the overvoltage is applied, and a separate packaging process is not required, thereby improving the process efficiency.

As set forth above, according to the present disclosure, a multi-layered ceramic capacitor which has an overvoltage protection function and can realize an improved process yield and miniaturization may be provided.

While exemplary embodiments have been shown and described above, it will be apparent to those skilled in the art that modifications and variations could be made without departing from the scope of the present invention as defined by the appended claims.

What is claimed is:

1. A multi-layered ceramic capacitor, comprising:
    a ceramic body including a first internal electrode, a second internal electrode, a dielectric layer, and an overvoltage protection layer; and
    an external electrode disposed on both ends of the ceramic body,
    wherein the overvoltage protection layer is disposed between the first internal electrode and the second internal electrode,
    wherein a length of the overvoltage protection layer is greater than a length of at least one of the first internal electrode or the second internal electrode, and
    wherein the overvoltage protection layer is directly connected to the external electrode.

2. The multi-layered ceramic capacitor of claim 1, wherein the overvoltage protection layer is composed of two or more overvoltage protection layers which are disposed adjacent to each other.

3. The multi-layered ceramic capacitor of claim 1, further comprising an isolation layer, wherein the first internal electrode, the overvoltage protection layer, the second internal electrode, and the isolation layer are stacked in sequence.

4. The multi-layered ceramic capacitor of claim 3, wherein two or more isolation layers are disposed adjacent to each other.

5. The multi-layered ceramic capacitor of claim 1, wherein the first internal electrode, the overvoltage protection layer, the dielectric layer, and the second internal electrode are stacked in sequence.

6. The multi-layered ceramic capacitor of claim 1, further comprising another dielectric layer, wherein the first internal electrode, the dielectric layer, the overvoltage protection layer, the another dielectric layer, and the second internal electrode are stacked in sequence.

7. The multi-layered ceramic capacitor of claim 1, wherein the overvoltage protection layer is spaced apart from the first internal electrode and the second internal electrode.

8. The multi-layered ceramic capacitor of claim 1, wherein the overvoltage protection layer is in contact with at least one of the first internal electrode or the second internal electrode.

9. The multi-layered ceramic capacitor of claim 1, wherein at least one of the first internal electrode or the second internal electrode extends from the external electrode in an extending direction to directly connect to the dielectric layer in the extending direction.

10. The multi-layered ceramic capacitor of claim 1, wherein the overvoltage protection layer extends from one of the both ends of the ceramic body to another one of the both ends of the ceramic body.

11. The multi-layered ceramic capacitor of claim 1, wherein an insulation resistance of the overvoltage protection layer is lower than an insulation resistance of the dielectric layer, when an overvoltage is applied.

12. A multi-layered ceramic capacitor comprising:
    a ceramic body including an internal electrode, a dielectric layer, and an overvoltage protection layer; and
    an external electrode disposed on both ends of the ceramic body, wherein an insulation resistance of the overvoltage protection layer is lower than an insulation resistance of the dielectric layer, when an overvoltage is applied, wherein a length of the overvoltage protection layer is greater than a length of the internal electrode, and wherein the overvoltage protection layer is directly connected to the external electrode.

13. The multi-layered ceramic capacitor of claim 12, wherein a ratio (B/A) is in a range of $10^2$ to $10^9$ when the overvoltage is applied, when an insulation resistance of the overvoltage protection layer is denoted by "A" and an insulation resistance of the dielectric layer is denoted by "B".

14. The multi-layered ceramic capacitor of claim 12, wherein the internal electrode extends from the external electrode in an extending direction to directly connect to the dielectric layer in the extending direction.

15. The multi-layered ceramic capacitor of claim 12, wherein the overvoltage protection layer extends from one of the both ends of the ceramic body to another one of the both ends of the ceramic body.

16. A multi-layered ceramic capacitor, comprising:
a ceramic body including a plurality of internal electrodes, a plurality of dielectric layers interposed between adjacent internal electrodes of the plurality of internal electrodes, and at least one overvoltage protection layer; and
first and second external electrodes respectively disposed on both ends of the ceramic body,
wherein the at least one overvoltage protection layer is disposed between two internal electrodes among the plurality of internal electrodes,
wherein a length of the at least one overvoltage protection layer is greater than a length of at least one of the plurality of internal electrodes, and
wherein the at least one overvoltage protection layer is directly connected to at least one of the first external electrode or the second external electrode.

17. The multi-layered ceramic capacitor of claim 16, wherein the at least one overvoltage protection layer includes two or more overvoltage protection layers disposed adjacent to each other.

18. The multi-layered ceramic capacitor of claim 16, further comprising at least one isolation layer, wherein a first internal electrode among the plurality of internal electrodes, the at least one overvoltage protection layer, a second internal electrode among the plurality of internal electrodes, and the at least one isolation layer are stacked in sequence.

19. The multi-layered ceramic capacitor of claim 16, wherein at least one of the plurality of internal electrodes extends from one of the first or second external electrodes in an extending direction to directly connect to one of the plurality of dielectric layers in the extending direction.

20. The multi-layered ceramic capacitor of claim 16, wherein the at least one overvoltage protection layer extends from one of the both ends of the ceramic body to another one of the both ends of the ceramic body.

21. The multi-layered ceramic capacitor of claim 16, wherein an insulation resistance of the at least one overvoltage protection layer is lower than an insulation resistance of at least one of the plurality of dielectric layers, when an overvoltage is applied.

* * * * *